US 8,571,208 B2

(12) United States Patent
Kim et al.

(10) Patent No.: US 8,571,208 B2
(45) Date of Patent: Oct. 29, 2013

(54) METHOD AND APPARATUS FOR PERFORMING TRICK PLAY ON SCRAMBLED DATA STREAM

(75) Inventors: Ho-seon Kim, Suwon-si (KR); Hyung-il Jang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1299 days.

(21) Appl. No.: 12/180,624

(22) Filed: Jul. 28, 2008

(65) Prior Publication Data

US 2009/0141888 A1 Jun. 4, 2009

(30) Foreign Application Priority Data

Dec. 4, 2007 (KR) .................. 10-2007-0124876

(51) Int. Cl.
*H04L 9/00* (2006.01)
(52) U.S. Cl.
USPC .............................. 380/42; 726/28
(58) Field of Classification Search
USPC .......................................................... 380/42
See application file for complete search history.

(56) References Cited

U.S. PATENT DOCUMENTS

| 5,481,553 | A | * | 1/1996 | Suzuki et al. | 714/800 |
| 5,850,379 | A | * | 12/1998 | Moriya et al. | 369/59.26 |
| 2001/0036269 | A1 | * | 11/2001 | Morinaga et al. | 380/203 |
| 2003/0215209 | A1 | * | 11/2003 | Kawaguchi | 386/7 |
| 2005/0036761 | A1 | * | 2/2005 | Seo et al. | 386/68 |
| 2005/0163222 | A1 | * | 7/2005 | Sane | 375/240.25 |
| 2006/0193597 | A1 | * | 8/2006 | Horii et al. | 386/46 |
| 2007/0076870 | A1 | * | 4/2007 | Takashima et al. | 380/200 |
| 2007/0110150 | A1 | * | 5/2007 | Wang et al. | 375/240.1 |
| 2009/0129689 | A1 | * | 5/2009 | Boyce | 382/236 |
| 2009/0288125 | A1 | * | 11/2009 | Morioka | 725/110 |

OTHER PUBLICATIONS

Yusei Nishimoto; Mar. 12, 2006; IEEE; vol. 52, issue 2; pp. 167-172.*

* cited by examiner

*Primary Examiner* — Mohammad W Reza
*Assistant Examiner* — Monjour Rahim
(74) *Attorney, Agent, or Firm* — Sughrue Mion, PLLC

(57) ABSTRACT

A method of performing trick play on a scrambled data stream, the method comprising: extracting position information corresponding to scrambling information from an input scrambled transport stream; demultiplexing a transport stream of a predetermined position according to the stored position information of the scrambling information and extracting the scrambling information and a scrambled data stream pertaining to the scrambling information; descrambling the extracted scrambled data stream by using the extracted scrambling information; and decoding a reference picture based on the position information.

17 Claims, 5 Drawing Sheets

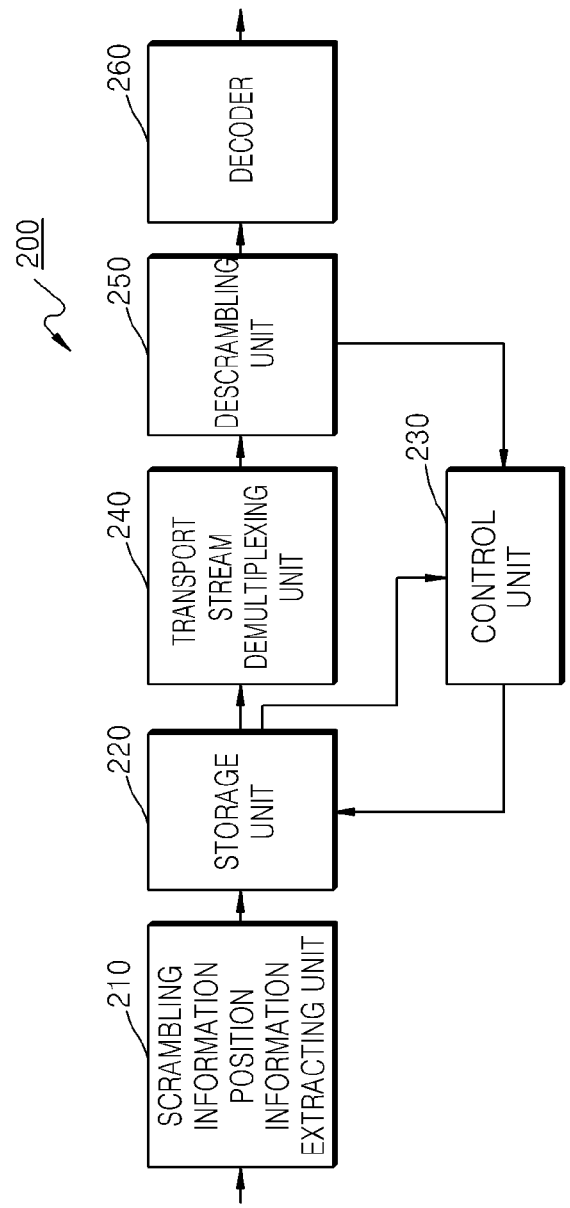

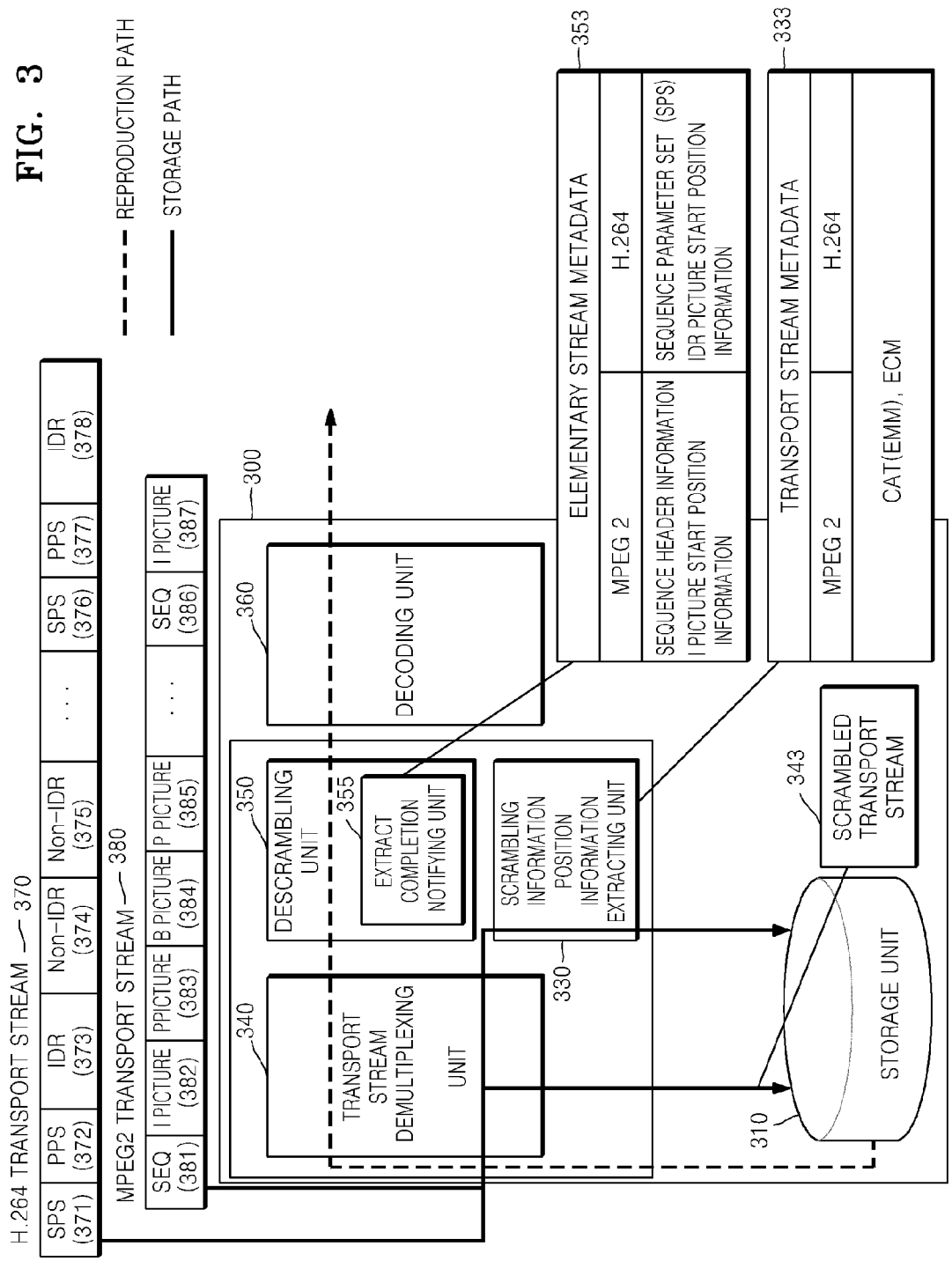

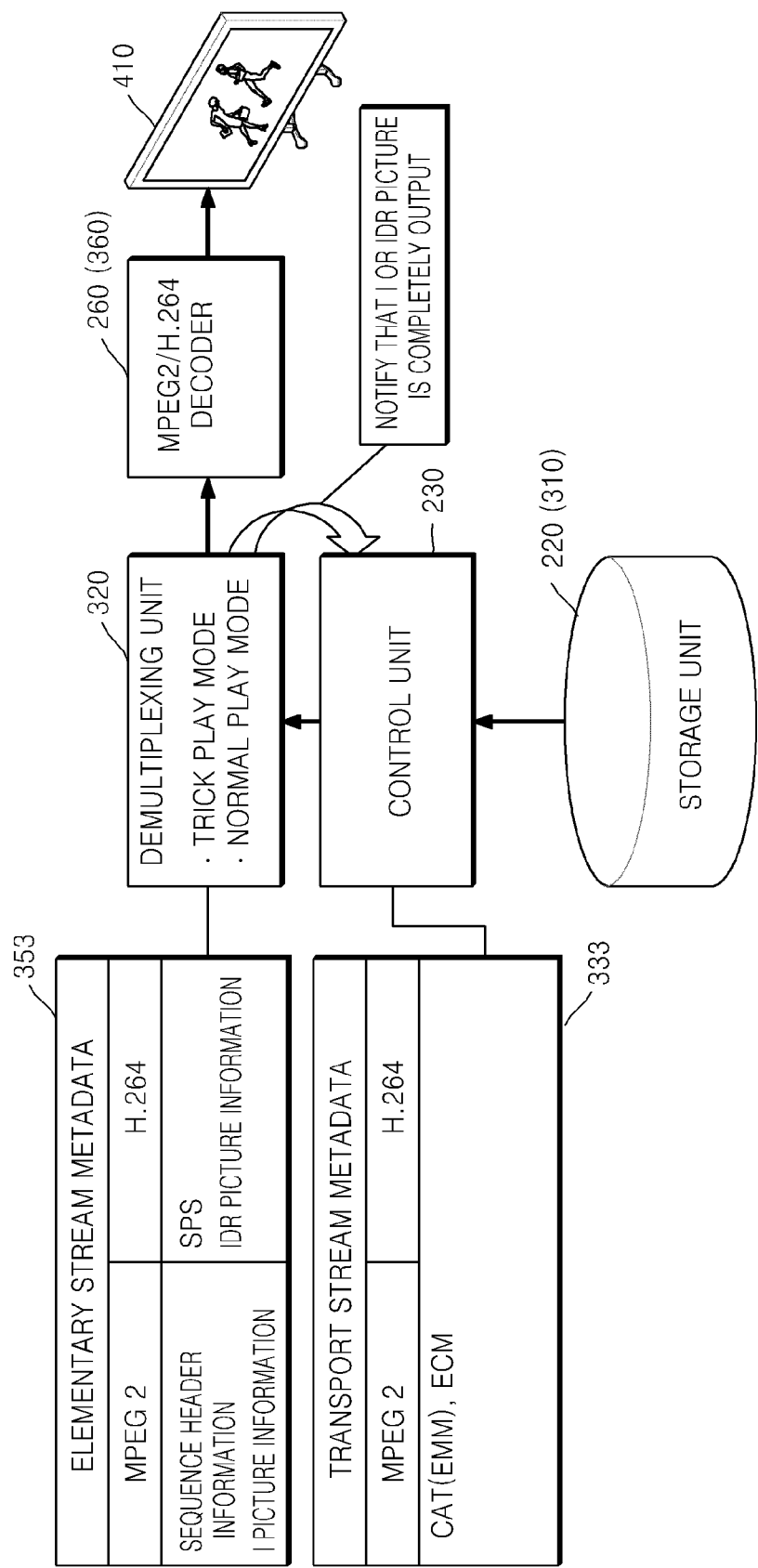

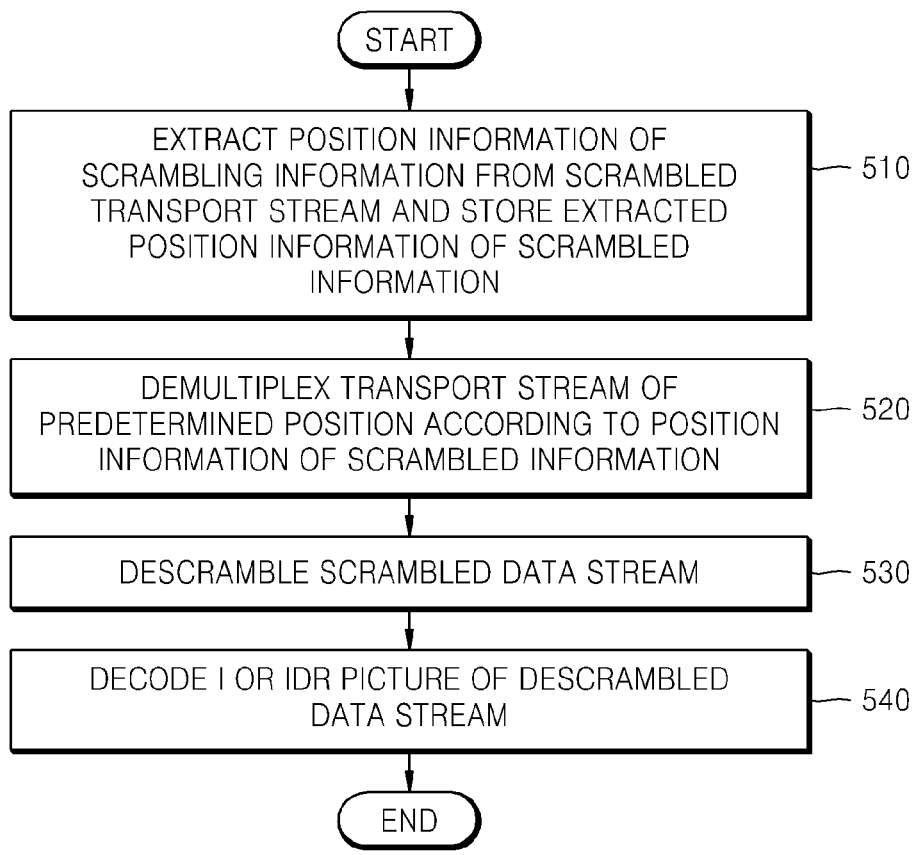

METHOD AND APPARATUS FOR PERFORMING TRICK PLAY ON SCRAMBLED DATA STREAM

CROSS-REFERENCE TO RELATED PATENT APPLICATION

This application claims priority from Korean Patent Application No. 10-2007-0124876, filed on Dec. 4, 2007, in the Korean Intellectual Property Office, the disclosure of which is incorporated herein in its entirety by reference.

BACKGROUND OF THE INVENTION

1. Field of the Invention

The present invention relates to a method and apparatus for performing trick play, and more particularly, to a method and apparatus for performing trick play on an input scrambled transport stream.

2. Description of the Related Art

In general, scrambled data streams are input to digital televisions (TVs) that can process moving picture experts group 2 (MPEG2) and H.264 data streams. In particular, European digital TVs are required to store scrambled data streams that are stored without being descrambled.

FIG. 1 illustrates a conventional personal video recorder (PVR) system 100 for performing trick play on a scrambled audio/video (AV) stream 120.

Referring to FIG. 1, the conventional PVR system 100 includes a transport stream (TS) demultiplexer 112, a TS de-scrambler 114, a TS rescrambler 116, and an MPEG2 decoder 118.

A conventional method of performing trick play on the scrambled AV stream 120 by using the conventional PVR system 100 will now be explained. The TS demultiplexer 112 receives the transmitted AV stream 120 and demultiplexes a program therefrom. The TS descrambler 114 descrambles the AV stream 120 and the TS rescrambler 116 stores an original data stream in a storage device 110. Sequence header information, Intra (I) picture information, predicted (P) picture information, and bi-directional (B) picture information (or sequence parameter set information, instantaneous decoding refresh (IDR) picture information, and non-IDR picture information) which are extracted from metadata of the descrambled AV stream 120 are also stored together with the original data stream in the storage device 110.

The MPEG2 decoder 118 decodes and reproduces a picture selected by using the sequence header information, the I picture information, the P picture information, and the B picture information (or the sequence parameter set information, the IDR picture information, and the non-IDR picture information).

However, the conventional method described with reference to FIG. 1 can be used only when both sequence header position information and picture position information can be known in advance. Accordingly, the conventional method cannot perform trick play when a scrambled stream is to be stored without being descrambled because picture position information cannot be known in advance.

SUMMARY OF THE INVENTION

The present invention provides a method of performing trick play on a scrambled data stream, which is stored without being descrambled, at various speeds.

According to an aspect of the invention, there is provided a method of performing trick play on a scrambled data stream, the method comprising: extracting position information corresponding to scrambling information from an input scrambled transport stream; demultiplexing a transport stream corresponding to a predetermined position according to the stored position information and extracting the scrambling information and a scrambled data stream pertaining to the scrambling information; descrambling the extracted scrambled data stream by using the extracted scrambling information; and decoding a reference picture.

The position information may be stored together with the scrambled transport stream.

The demultiplexing of the transport stream of the predetermined position and the extracting of the scrambling information and the scrambled data stream may comprise: setting a trick play speed; determining a position of a transport stream to be demultiplexed according to the stored position information corresponding to the scrambling information and the set trick play speed; and demultiplexing the transport stream of the determined position and extracting the scrambling information and the scrambled data stream.

The method may further comprise: extracting position information corresponding to a reference picture from the descrambled data stream; extracting the reference picture from the descrambled data stream by using the extracted position information corresponding to the reference picture, wherein the decoding comprises decoding the extracted reference picture by using the position information corresponding to the reference picture.

After the extracting of the reference picture from the descrambled data stream, the demultiplexing may comprise maintaining a standby state until a next scrambled transport stream is input, and the descrambling may comprise maintaining a standby state until a next scrambled data stream is input.

The extracting of the reference picture may comprise generating extract completion information indicating that the reference picture is completely extracted, and the method may further comprise: after the generating of the extract completion information, determining a transport stream of a next position to be reproduced by using the position information corresponding to the scrambling information and the trick play speed; and demultiplexing the determined transport stream of the next position.

The scrambling information may comprise at least one of a conditional access table (CAT), an entitlement management message (EMM), and an entitlement control message (ECM).

The method may further comprise setting a reproduction mode to any one of a trick play mode and a normal play mode, wherein the trick play mode comprises a single speed mode, a fast forward or fast backward mode, and a random access mode.

According to another aspect of the invention, there is provided an apparatus for performing trick play on a scrambled data stream, the apparatus comprising: a scrambling information position information extracting unit which extracts position information corresponding to scrambling information from an input scrambled transport stream; and a decoder which decodes a reference picture based on the position information.

According to another aspect of the invention, there is provided an apparatus for performing trick play on a scrambled data stream, the apparatus comprising: a scrambling information position information extracting unit which extracts position information corresponding to scrambling information from an input scrambled transport stream; a transport stream demultiplexing unit which demultiplexes a transport stream of a predetermined position according to the stored position information and extracts the scrambling information and a scrambled data stream pertaining to the scrambling information; a descrambling unit which descrambles the extracted scrambled data stream by using the extracted scrambling information; and a decoder which decodes a reference picture.

The apparatus may further comprise: a storage unit which stores the position information and the scrambled transport stream; and a control unit which controls data flow between the storage unit, the transport stream demultiplexing unit, the descrambling unit, and the decoder.

If the scrambled transport stream is an MPEG2 scrambled transport stream, an intra (I) frame may be used as the reference picture, and if the scrambled transport stream is an H.264 scrambled transport stream, an instantaneous decoding refresh (IDR) picture may be used as the reference picture.

According to another aspect of the present invention, there is provided a computer-readable recording medium having embodied thereon a program for executing the methods described above.

BRIEF DESCRIPTION OF THE DRAWINGS

The above and other features and advantages of the present invention will become more apparent by describing in detail exemplary embodiments thereof with reference to the attached drawings in which:

FIG. 2 is a block diagram of an apparatus for performing trick play on a scrambled data stream according to an exemplary embodiment of the present invention;

FIG. 3 illustrates an apparatus for performing trick play on a scrambled data stream according to another exemplary embodiment of the present invention;

FIG. 4 illustrates the operation of a control unit used in the apparatus of FIG. 2 or 3 according to an exemplary embodiment of the present invention; and FIG. 5 is a flowchart illustrating a method of performing trick play on a scrambled data stream according to an exemplary embodiment of the present invention.

DETAILED DESCRIPTION OF THE INVENTION

Figure 1:
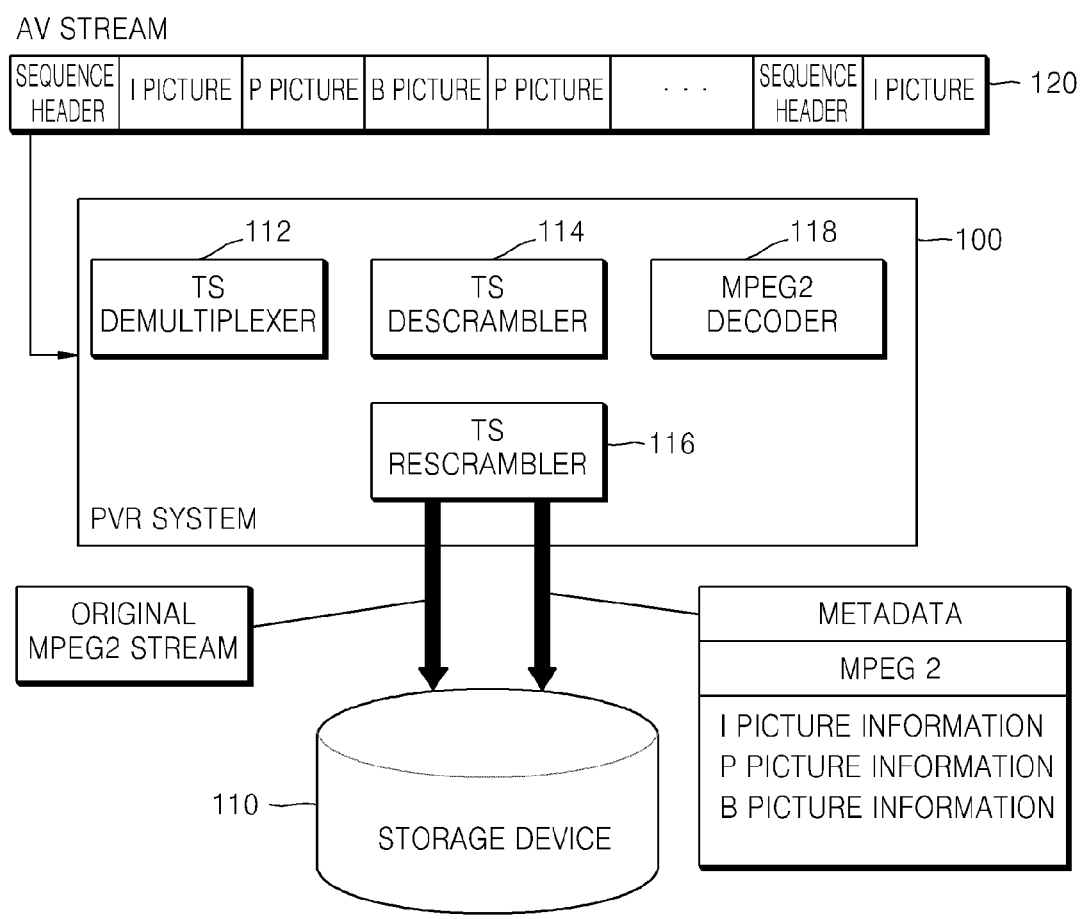
FIG. 1 illustrates a conventional system for performing trick play on a scrambled audio/video (AV) stream.

The present invention will now be described more fully with reference to the accompanying drawings, in which exemplary embodiments of the invention are shown.

A method and apparatus for performing trick play on a scrambled data stream according to embodiments of the present invention will now be explained with reference to FIGS. 2 through 5.

FIG. 2 is a block diagram of an apparatus 200 for performing trick play on a scrambled data stream according an embodiment of the present invention.

Referring to FIG. 2, the apparatus 200 includes a scrambling information position information extracting unit 210, a storage unit 220, a control unit 230, a transport stream demultiplexing unit 240, a descrambling unit 250, and a decoder 260. The apparatus 200 may be a personal video recorder (PVR) system.

The scrambling information position information extracting unit 210 receives a scrambled transport stream, extracts position information corresponding to scrambling information from the received scrambled transport stream, and outputs the position information corresponding to the scrambling information to the storage unit 220. The scrambled transport stream includes at least one scrambled data stream.

The scrambling information may be a table having position information which is included in the scrambled transport stream on which at least one of a conditional access table (CAT), an entitlement management message (EMM), and an entitlement control message (ECM) is recorded. Since the scrambling information is periodically included in the scrambled transport stream, when scrambling information pertaining to a data stream of a desired position is needed, position information corresponding to the scrambling information is needed.

The storage unit 220 receives the scrambled transport stream and the position information corresponding to the scrambling information from the scrambling information position information extracting unit 210 and stores the data. The storage unit 220 may output the stored data to the control unit 230 and the transport stream demultiplexing unit 250. The scrambled transport stream input to the apparatus 200 may be demultiplexed and then stored in the storage unit 220.

The control unit 230 controls data flow between the storage unit 220, the transport stream demultiplexing unit 240, the descrambling unit 250, and the decoder 260. The control unit 230 may be software or hardware. The control unit 230 may perform a trick play control function for the PVR system.

The control unit 230 determines any one of a trick play mode and a normal play mode as a reproduction mode of the apparatus 200. In FIG. 2, the trick play mode includes a single speed mode, a fast forward or fast backward mode, and a random access mode.

For example, if an MPEG2 data stream is reproduced, the single speed mode is performed such that all of an intra (I) picture, a bi-directional (B) picture, and a predicted (P) picture are processed and reproduced, the fast forward or fast backward mode is performed such that a reference picture, that is, the I picture, is periodically selected and reproduced from data forwardly or backwardly moving according to a reproduction speed, and the random access mode is performed such that the reference picture, that is, the I picture, is directly accessed and reproduced. If an H.264 data stream is reproduced, an instantaneous decoding refresh (IDR) picture instead of the I picture is processed as a reference picture and a non-IDR picture instead of the B picture and the P picture is processed.

Although the MPEG2 and H.264 data streams are reproduced, the present embodiment is not limited thereto. Also, although the I picture of the MPEG2 data stream or the IDR picture of the H.264 data stream is used as the reference picture, the present embodiment is not limited thereto.

The control unit 230 may set a trick play speed and determine a position of a transport stream to be demultiplexed according to the stored position information corresponding to the scrambling information and the set trick play speed. The control unit 230 may control the transport stream of the position determined according to the position information corresponding to the scrambling information and the trick play speed to be output from the storage unit 220 to the transport stream demultiplexing unit 240.

The transport stream demultiplexing unit 240 may receive the position information corresponding to the scrambling information from the storage unit 220, demultiplex a transport stream of a predetermined position according to the position information corresponding to the scrambling information, extract the scrambling information and a scrambled data stream pertaining to the scrambling information, and output the extracted scrambling information and scrambled data stream to the descrambling unit 250. The scrambling information is used to descramble the scrambled data stream. The transport stream demultiplexing unit 240 extracts the scrambling information from the transport stream and also extracts the scrambled data stream to be descrambled by using the extracted scrambling information.

Alternatively, when the control unit 230 controls a transport stream of a predetermined position determined according to the position information corresponding to the scrambling information to be output from the storage unit 220 to the transport stream demultiplexing unit 240, the transport stream demultiplexing unit 240 may demultiplex the transport stream, and output the scrambling information and a scrambled data stream.

The descrambling unit 250 receives the scrambling information and the scrambled data stream from the transport stream demultiplexing unit 240, descrambles the scrambled data stream by using the scrambling information, and outputs the descrambled data stream to the control unit 230 and the decoder 260.

The descrambling unit 250 may include a reference picture position information extracting unit extracting position information corresponding to a reference picture from metadata of the descrambled data stream. Accordingly, the position information corresponding to the reference picture, that is, the I picture in the case of the MPEG2 stream or the IDR picture in the case of the H.264 stream, is used to output the reference picture, i.e., the I or IDR picture, from the descrambled data stream to the decoder 260. The position information corresponding to the reference picture includes start position information or end position information corresponding to the reference picture.

Although not shown, the descrambling unit 250 of FIG. 2 may include an extract completion notifying unit generating extract completion information indicating that the reference picture is completely extracted and outputting the generated extract completion information to the control unit 230. The control unit 230 receiving the extract completion information from the extract completion notifying unit may determine a transport stream of a next position to be reproduced by using the position information corresponding to the scrambling information and the trick play speed, and output the determined transport stream of the next position from the storage unit 220 to the transport stream demultiplexing unit 240.

After the reference picture is extracted by the descrambling unit 250 from the descrambled data stream, the transport stream demultiplexing unit 240 may remain in a standby state until a next scrambled transport stream is input and the descrambling unit 250 may remain in a standby state until a next scrambled data stream is input.

The decoder 260 receives the reference picture of the descrambled data stream from the descrambling unit 250, decodes the received reference picture, and outputs a restored image.

Accordingly, the apparatus 200 of FIG. 2 performs trick play on a scrambled data stream by repeatedly performing demultiplexing, descrambling, and decoding processes on a transport stream of a predetermined position determined by the control unit 230 respectively by means of the transport stream demultiplexing unit 240, the descrambling unit 250, and the decoding unit 260.

FIG. 3 illustrates an apparatus 300 for performing trick play on a scrambled data stream according to another embodiment of the present invention.

Referring to FIG. 3, the apparatus 300 includes a storage unit 310, a demultiplexing unit 320, and a decoding unit 360. The demultiplexing unit 320 includes a scrambled information position information extracting unit 330, a transport stream demultiplexing unit 340, and a descrambling unit 350. The descrambling unit 350 includes an extract completion notifying unit 355.

The apparatus 300 may receive and reproduce an H.264 transport stream 370 or an MPEG2 transport stream 380.

The H.264 transport stream 370 includes sequence parameter sets (SPSs) 371 and 376, picture parameter sects (PPSs) 372 and 377, IDR pictures 373 and 378, and non-IDR pictures 374 and 375.

The H.264 transport stream 370 is repeatedly transmitted in units. That is, referring to FIG. 3, the SPS 371, the PSS 372, the IDR picture 373, and the non-IDR pictures 374 and 375 are transmitted in one unit, and the SPS 376, the PPS 377, and the IDR picture 378 are transmitted in another unit.

The MPEG2 transport stream 380 includes sequence headers (SEQs) 381 and 386, I pictures 382 and 387, P pictures 383 and 385, and a B picture 384.

The MPEG2 transport stream 380 is repeatedly transmitted in units. The P picture (or the B picture) may not be included in the units of the MPEG2 transport stream 380. Referring to FIG. 3, the sequence header 381, the I picture 382, the P picture 383, the B picture 384, and the P picture 385 are transmitted in one unit, and the sequence header 386 and the I picture 387 are transmitted in another unit.

When the transport stream 370 or 380 is input to the apparatus 300, the transport stream 370 or 380 is demultiplexed into a demultiplexed scrambled transport stream 343 by the transport stream demultiplexing unit 340, and scrambling information position information 333 is extracted by the scrambling information position information extracting unit 330 from the transport stream 370 or 380.

The demultiplexed scrambled transport stream 343 obtained by the transport stream demultiplexing unit 340 and the scrambling information position information 333 obtained by the scrambling information position information extracting unit 330 are output to the storage unit 310.

When trick play is ordered by a user, the scrambling information position information 333 and the demultiplexed scrambled transport stream 343 are output from the storage unit 310 to the demultiplexing unit 320. A transport stream of a predetermined position to be reproduced is determined from among the scrambled transport stream 343 according to the scrambling information position information 333 and the trick play speed.

The descrambling unit 350 descrambles a scrambled data stream extracted after demultiplexing the transport stream of the predetermined position, extracts the I picture 382 or 387 or the IDR picture 373 or 378 corresponding to the predetermined position, and outputs the extracted picture to the decoding unit 360. The descrambling unit 350 extracts I or IDR picture information 353 from elementary stream metadata on which real media data is recorded. In the case of the MPEG2 transport stream 380, the I or IDR picture information 353 includes the sequence header information 381 or 386 and I picture start position information, and in the case of the H.264 transport stream 370, the I or IDR picture information 353 includes the SPS 371 or 376 and IDR picture start position information.

Accordingly, the descrambling unit 350 can output descrambled data including a desired I or IDR picture to the decoding unit 360 by using the I or IDR picture information 353 including the sequence header information 381 or 386 and the I picture start position information or the SPS 371 or 376 and the IDR picture start position information which is extracted from the elementary stream metadata.

The descrambling unit 350 may search for an I or IDR picture by extracting and using I or IDR picture end position information as well as the I or IDR picture start position information.

FIG. 4 illustrates the operation of the control unit 230 used in the apparatus of FIG. 2 or 3 according to an embodiment of the present invention.

Referring to FIG. 4, the control unit 230 receives position information corresponding to CAT (EMM) and ECM which is scrambling information position information 333 extracted from transport stream metadata, and determines a transport stream of a predetermined position to be reproduced according to a trick play speed. The control unit 230 sets a trick play mode among a trick play mode and a normal play mode, and outputs the transport stream of the determined position from the storage unit 220 or 310 to the demultiplexing unit 320.

In the trick play mode, the demultiplexing unit 320 demultiplexes and descrambles the transport stream of the predetermined position, and extracts I or IDR picture information 353 including sequence header information and I picture information or SPS and IDR picture information from elementary stream metadata. The demultiplexing unit 320 extracts I or IDR picture data from an elementary stream by using the I or IDR picture information 353 and outputs the extracted I or IDR picture data to the MPEG2 or H.264 decoder 260 or 360.

The decoder 260 or 360 decodes and restores the I or IDR picture data, and outputs the restored data to a display device 410 on which the data is displayed.

After the demultiplexing unit 320 extracts the I or IDR picture data from the elementary stream and outputs the extracted I or IDR picture data to the decoder 260 or 360, the demultiplexing unit 320 notifies the control unit 230 that a reference picture is completely output, that is, an I or IDR picture is completely output. When the control unit 230 recognizes that the I or IDR picture is completely output, the control unit 230 determines a transport stream of a next position according to a reproduction speed and scrambling information position information, and controls the transport stream of the next position to be output from the storage unit 220 or 310 to the demultiplexing unit 320.

Accordingly, once the control unit 230 determines a transport stream of a predetermined position and sends the determined transport stream of the predetermined position to the demultiplexing unit 320, and the demultiplexing unit 320 demultiplexes and descrambles the transport stream of the predetermined position, outputs the descrambled transport stream of the predetermined position to the decoder 260 or 360 and notifies the control unit 230 of the output completion, the control unit 230 and the demultiplexing unit 320 repeat the above processes.

FIG. 5 is a flowchart illustrating a method of performing trick play on a scrambled data stream according to an embodiment of the present invention.

In operation 510, position information corresponding to scrambling information is extracted from an input scrambled transport stream and stored in a storage unit. The position information corresponding to the scrambling information may be stored together with the scrambled transport stream.

In operation 520, a transport stream of a predetermined position is demultiplexed according to the stored position information corresponding to the scrambling information and the scrambling information and a scrambled data stream pertaining to the scrambling information are extracted. When a trick play speed is set, a position of a transport stream to be demultiplexed is determined according to the position information corresponding to the scrambling information and the trick play speed.

In operation 530, a scrambled data stream is descrambled by using the scrambling information extracted in operation 520.

In operation 540, a reference picture of the descrambled data stream is decoded. A reference picture may be extracted from the descrambled data stream by using position information corresponding to the reference picture extracted from the descrambled data stream.

Once the reference picture is completely extracted, extract completion information is generated. When the extract completion information of the current reference picture is confirmed, a transport stream of a next position to be reproduced is determined and demultiplexed by using the position information corresponding to the scrambling information and the trick play speed.

The present invention may be embodied in a general purpose digital computer by running a program from a computer-readable medium. Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)) and carrier waves (e.g., transmissions over the Internet).

As described above, since position information corresponding to scrambling information is extracted from a transport stream, the fact that an I picture or an IDR picture is completely output is notified, and only the I picture or the IDR picture is output to the decoder, the method and apparatus for performing trick play on the scrambled data stream according to the present invention can process only data necessary for trick play.

Furthermore, since trick play can be performed on a scrambled transport stream that is stored without being descrambled, the method and apparatus according to the present invention can protect content for content providers.

Moreover, since only a transport stream of only a desired position is demultiplexed according to a reproduction speed and only necessary data is descrambled and decoded, the method and apparatus according to the present invention can effectively perform trick play at various reproduction speeds.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of performing trick play on a scrambled data stream, the method comprising:

extracting, by an apparatus for performing trick play, position information corresponding to scrambling information from an input scrambled transport stream;

demultiplexing a transport stream corresponding to a predetermined position according to the position information and extracting the scrambling information and a scrambled data stream pertaining to the scrambling information;

descrambling the extracted scrambled data stream by using the extracted scrambling information;
extracting position information corresponding to a reference picture from the descrambled data stream;
extracting the reference picture from the descrambled data stream by using the extracted position information corresponding to the reference picture; and
decoding the extracted reference picture by using the position information corresponding to the reference picture.

2. The method of claim 1, wherein the position information is stored together with the scrambled transport stream.

3. The method of claim 1, wherein the demultiplexing of the transport stream of the predetermined position and the extracting of the scrambling information and the scrambled data stream comprises:
setting a trick play speed;
determining a position of a transport stream to be demultiplexed based on the position information and the set trick play speed; and
demultiplexing the transport stream corresponding to the determined position and extracting both the scrambling information and the scrambled data stream according to the determined position.

4. The method of claim 1, wherein, after the extracting of the reference picture from the descrambled data stream, the demultiplexing comprises maintaining a standby state until a next scrambled transport stream is input, and the descrambling comprises maintaining a standby state until a next scrambled data stream is input.

5. The method of claim 1, wherein the extracting of the reference picture comprises generating extract completion information indicating that the reference picture is completely extracted, the method further comprising:
after the generating of the extract completion information, determining a transport stream of a next position to be reproduced by using the position information and the trick play speed; and
demultiplexing the determined transport stream of the next position.

6. The method of claim 1, wherein the scrambling information comprises at least one of a conditional access table (CAT), an entitlement management message (EMM), and an entitlement control message (ECM).

7. The method of claim 1, further comprising setting a reproduction mode to any one of a trick play mode and a normal play mode,
wherein the trick play mode comprises a single speed mode, a fast forward or fast backward mode, and a random access mode.

8. The method of claim 1, wherein, if the scrambled transport stream is an MPEG2 scrambled transport stream, an intra (I) frame is used as the reference picture, and if the scrambled transport stream is an H.264 scrambled transport stream, an instantaneous decoding refresh (IDR) picture is used as the reference picture.

9. An apparatus for performing trick play on a scrambled data stream, the apparatus comprising at least one hardware processor which comprises:
a scrambling information position information extracting unit which extracts position information corresponding to scrambling information from an input scrambled transport stream;
a transport stream demultiplexing unit which demultiplexes a transport stream of a predetermined position according to the position information and extracts the scrambling information and a scrambled data stream pertaining to the scrambling information;
a descrambling unit which descrambles the extracted scrambled data stream by using the extracted scrambling information;
a reference picture position information extracting unit which extracts position information corresponding to a reference picture from metadata of the descrambled data stream, and outputs the reference picture from the descrambled data stream to the decoder by using the position information corresponding to the reference picture; and
a decoder which decodes a reference picture.

10. The apparatus of claim 9, further comprising:
a storage unit which stores the position information and the scrambled transport stream; and
a control unit which controls data flow between the storage unit, the transport stream demultiplexing unit, the descrambling unit, and the decoder.

11. The apparatus of claim 10, wherein the control unit sets a trick play speed, determines a position of a transport stream to be demultiplexed according to the stored position information and the set trick play speed, and outputs the transport stream of the determined position from the storage unit to the transport stream demultiplexing unit.

12. The apparatus of claim 9, wherein, after the reference picture is output to the decoder, the transport stream demultiplexing unit remains in a standby state until a next scrambled transport stream is input, and the descrambling unit remains in a standby state until a next scrambled data stream is input.

13. The apparatus of claim 9, wherein the descrambling unit comprises an extract completion notifying unit which generates extract completion information indicating that the reference picture is completely extracted and outputs the generated extract completion information to the control unit,
wherein the control unit receiving the extract completion information determines a transport stream of a next position to be reproduced by using the position information corresponding to the scrambling information and the trick play speed and outputs the determined transport stream of the next position from the storage unit to the transport stream demultiplexing unit.

14. The apparatus of claim 9, wherein the scrambling information comprises at least one of a CAT, an EMM, and an ECM.

15. The apparatus of claim 9, wherein the control unit determines one of a trick play mode and a normal play mode,
wherein the trick play mode comprises a single speed mode, a fast forward or fast backward mode, and a random access mode.

16. The apparatus of claim 9, wherein, if the scrambled transport stream is an MPEG2 scrambled transport stream, an I picture is used as the reference picture, and if the scrambled transport stream is an H.264 scrambled transport stream, an IDR picture is used as the reference picture.

17. A non-transitory computer-readable recording medium having embodied thereon a program for executing a method comprising:
extracting position information corresponding to scrambling information from an input scrambled transport stream;
demultiplexing a transport stream corresponding to a predetermined position according to the position information and extracting the scrambling information and a scrambled data stream pertaining to the scrambling information;
descrambling the extracted scrambled data stream by using the extracted scrambling information;

extracting position information corresponding to a reference picture from the descrambled data stream;
extracting the reference picture from the descrambled data stream by using the extracted position information corresponding to the reference picture; and
decoding the extracted reference picture by using the position information corresponding to the reference picture.

\* \* \* \* \*